June 17, 1941.   W. H. WILSON   2,246,410
SEMITRAILER STRUCTURE
Filed July 13, 1939   4 Sheets-Sheet 1
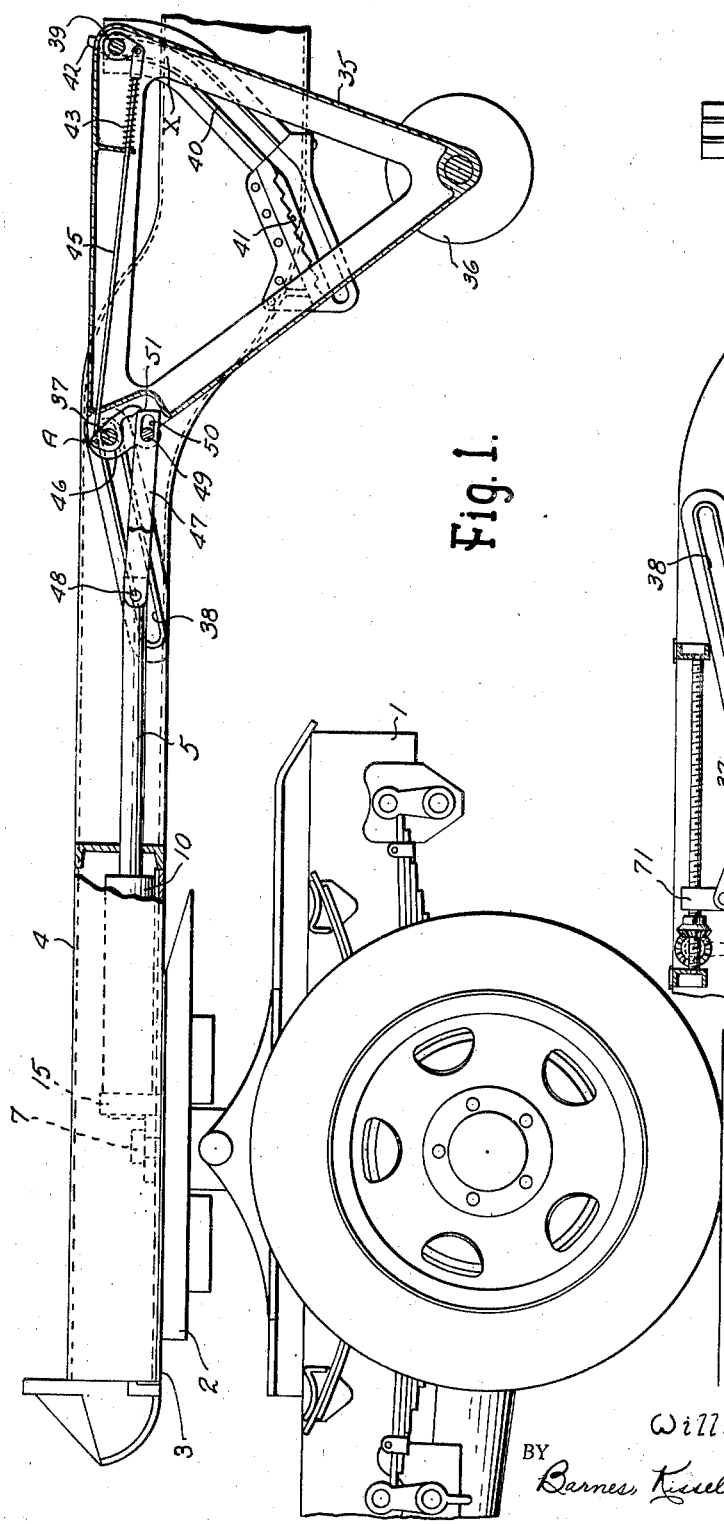
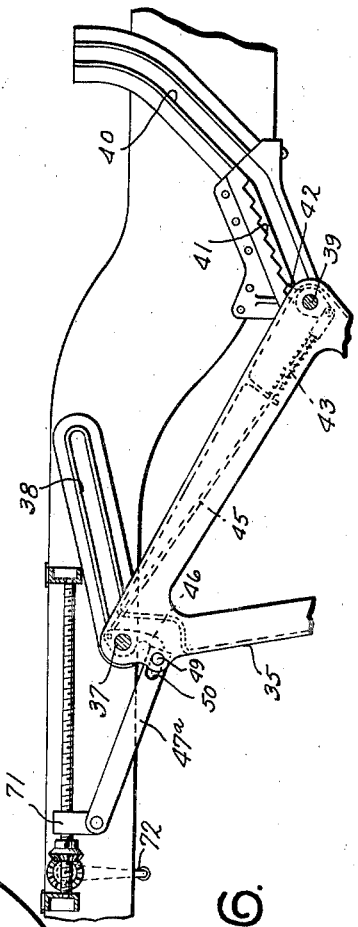
INVENTOR.
William H. Wilson
BY Barnes, Kisselle, Laughlin & Raisch
ATTORNEYS

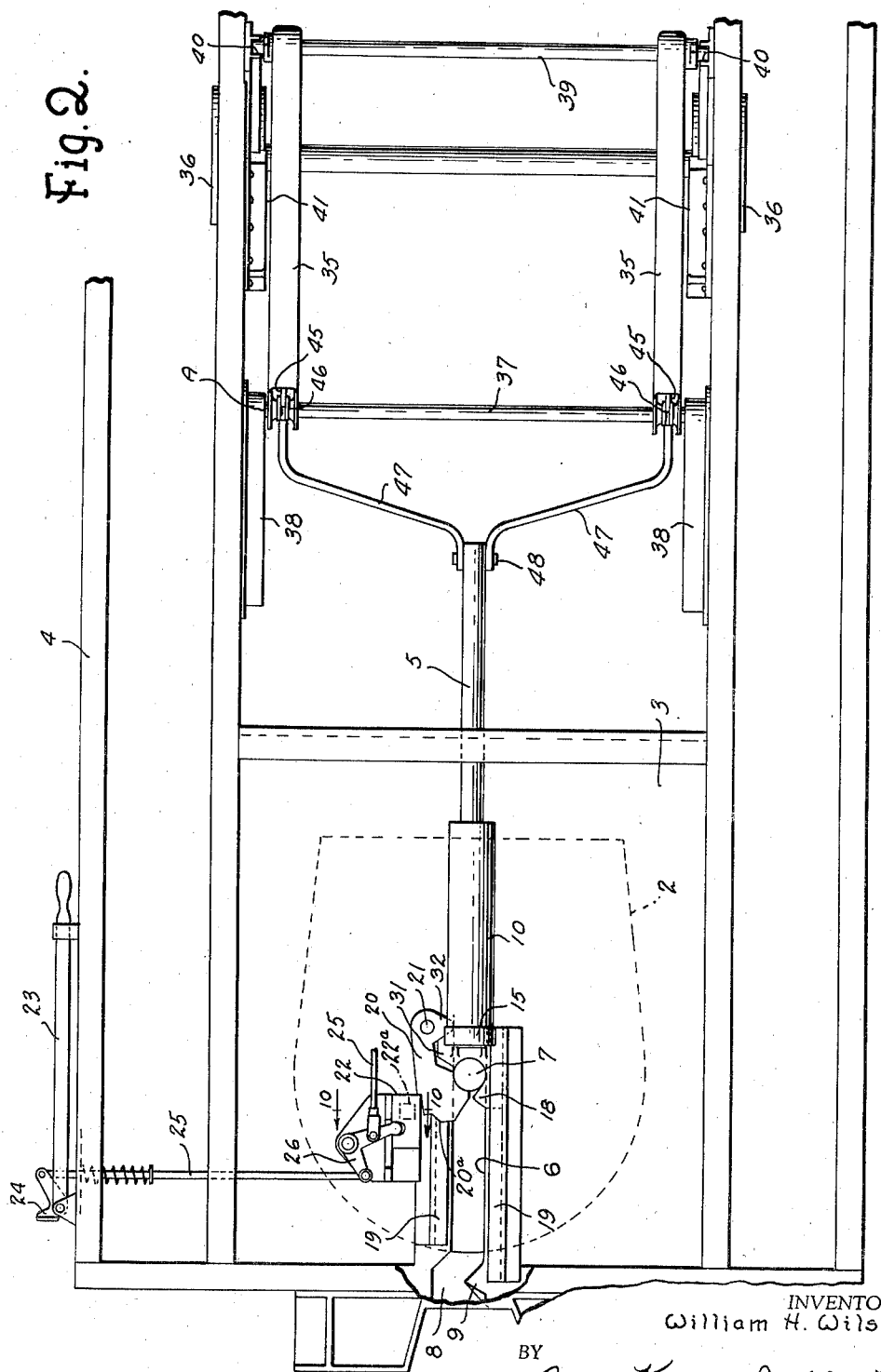

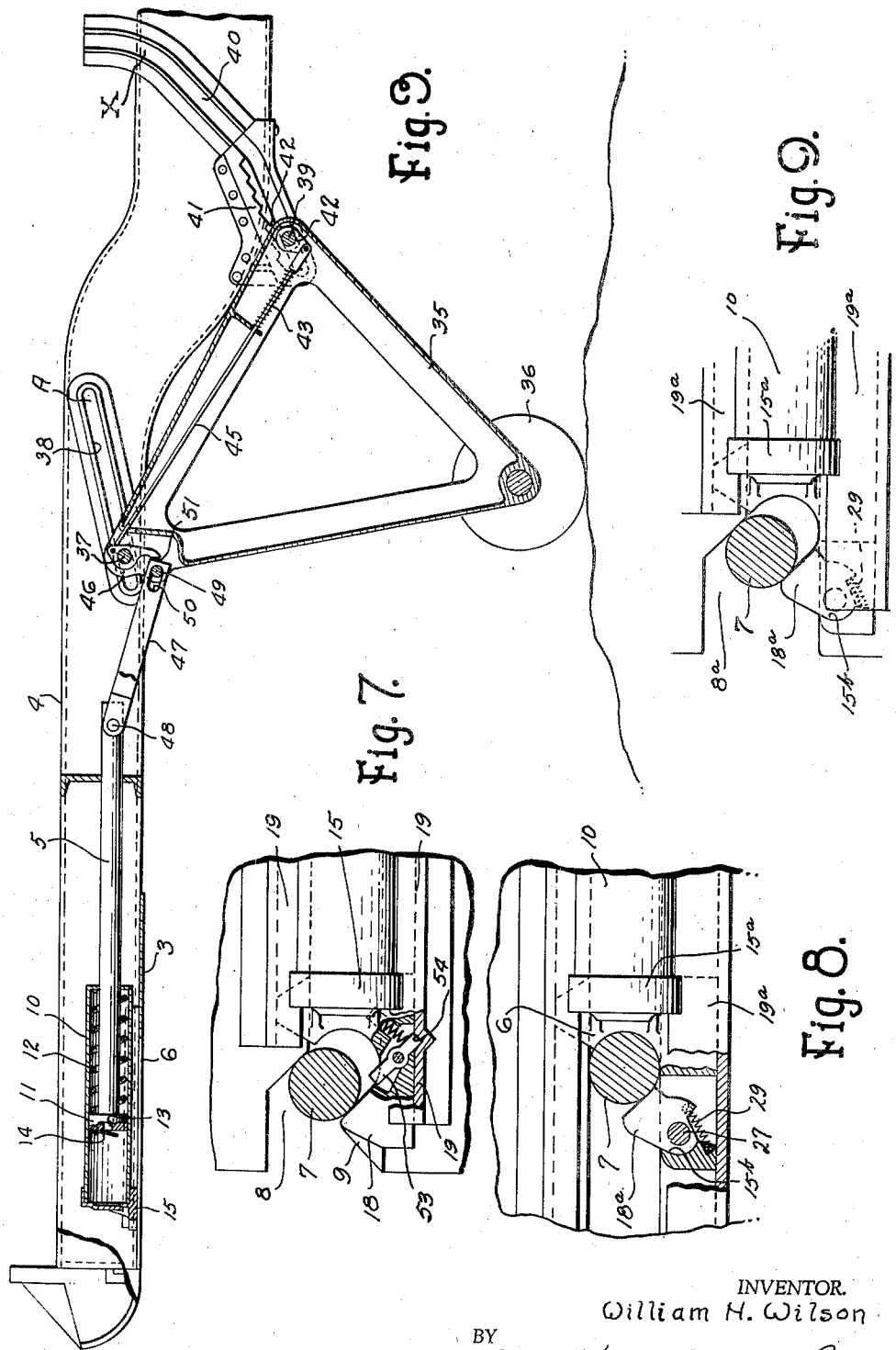

June 17, 1941.   W. H. WILSON   2,246,410
SEMITRAILER STRUCTURE
Filed July 13, 1939   4 Sheets-Sheet 4

INVENTOR.
William H. Wilson
BY
Barnes, Kisselle, Laughlin & Raisch
ATTORNEYS

Patented June 17, 1941

2,246,410

UNITED STATES PATENT OFFICE 2,246,410

SEMITRAILER STRUCTURE

William H. Wilson, Detroit, Mich.

Application July 13, 1939, Serial No. 284,157

21 Claims. (Cl. 280—33.1)

This invention relates to trailers which are used with tractors, where the forward end of the trailer is supported by the tractor when the tractor and trailer are coupled for combined operation. Trailers of this type are commonly referred to as semi-trailers.

Semi-trailers usually have supporting legs at the forward end which are moved into position to support the semi-trailer when the tractor is uncoupled therefrom and which are folded out of supporting position when the tractor and semi-trailer are coupled. One way of getting the legs into supporting position is to have the tractor pull the legs into supporting position as the tractor and semi-trailer are uncoupled, for which purpose the draft coupling means permits of relative movement between the tractor and trailer before the final uncoupling operation. The terrain, however, is not always level, and the legs may strike a high spot or hummock before the final uncoupling operation, with the result that the semi-trailer may be forced or jacked upwardly. On the other hand, in coupling, the semi-trailer may be jacked upwardly as the tractor pushes the legs towards folded position, this occurring in the act of releasing the legs from a holding notch. This latter situation may occur where a tractor has not sufficiently elevated the semi-trailer before the pressure is applied to the legs to move them to folded position. These things place undue loads and strains on the legs and the operating mechanism, particularly where the semi-trailer is heavily loaded.

This invention is directed to an improved arrangement in semi-trailers, and particularly to an improved supporting leg structure. The supporting structure is advantageous for use in the so-called automatic semi-trailer, that is one where the legs come into supporting position automatically upon tractor semi-trailer uncoupling and are shifted to folded position automatically when the tractor and semi-trailer are coupled. However, the supporting legs may be manually operated. In accordance with the invention, supporting legs are provided in conjunction with operating means for pulling the legs down, whereby the supporting legs may stop in their supporting position even though they come into contact with a high spot or hummock, and a yieldable arrangement is provided in operating the means permitting continued movement of the tractor relative to the semi-trailer without a corresponding movement of the supporting legs. Also, in the coupling operation the arrangement is such that a preliminary action is that of unlatching the legs from their supporting position before forces are delivered thereto by the tractor which tend to position the legs into folded position, thus making it unnecessary to forcibly elevate the semi-trailer to accomplish such unlatching.

Several arrangements for carrying out the invention are disclosed in the accompanying drawings.

Fig. 1 is a side elevational view showing the rear end of a tractor and the forward end of a semi-trailer in coupled relation with parts cut away to illustrate the supporting leg structure.

Fig. 2 is a plan view of the semi-trailer frame.

Fig. 3 is a view of the semi-trailer showing the legs in supporting position and with the semi-trailer detached from the tractor.

Fig. 6 is a view illustrating a manually operating device for controlling the legs.

Fig. 7 is a detailed view of the coupling head which may be used on the semi-trailer.

Fig. 8 is a view illustrating a modified form of coupling head.

Fig. 9 is a view similar to Fig. 8 showing the parts in the position just at the release.

Fig. 11 is an enlarged detail in section showing the port and check valve in the piston.

Figure 4:
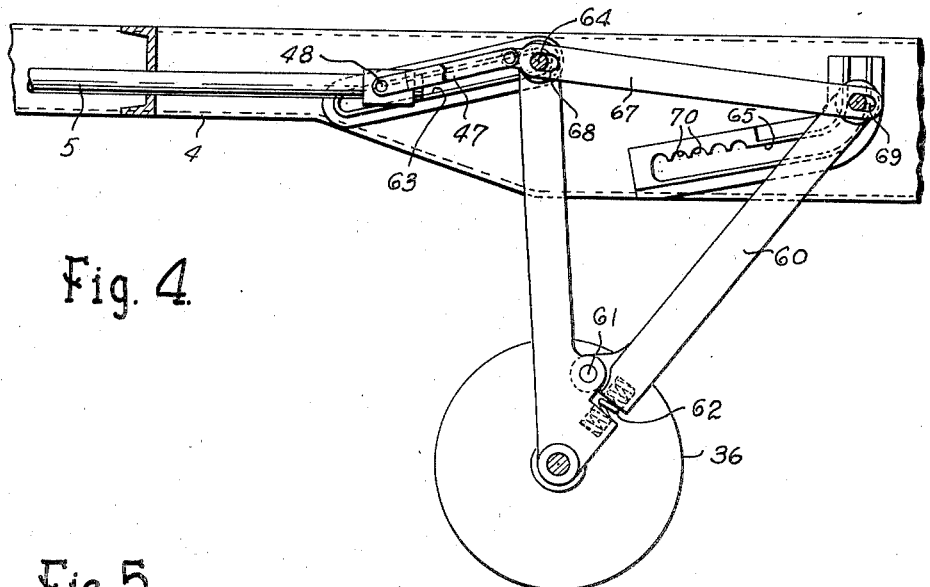
Fig. 4 is a view of a further modified form showing the legs in folded position.

In Fig. 1 the rear end of a tractor is generally illustrated at 1 and it may be equipped with the usual rocking lower fifth wheel 2, and the semi-trailer has an upper fifth wheel member 3 designed to rest thereon.

Before proceeding with the description of the supporting legs, reference can be made to Fig. 2 where the semi-trailer frame is illustrated at 4, and reciprocably mounted in the frame is a service bar 5. The upper fifth wheel 3 has a slot 6 for the reception of the king pin 7 on the tractor. The coupling means between the tractor and semi-trailer is subject to variation, but the coupling means illustrated is substantially the same as that shown in my Patent No. 2,135,205 of November 1, 1938. The forward end of the slot 6 is off-set as shown at 8, there being a projection 9 that extends laterally of the slot. A yieldable arrangement is provided in the service bar 5 and, as illustrated in Fig. 1, this arrangement resides in a cylinder or sleeve 10 in which a head 11 is disposed, the head being attached to the forward end of the bar 5. Between the head and the rear end of the cylinder is disposed a coil spring 12. The head 11 may have a port 13 therethrough in connection with which there is a flapper valve 14. The rod 5 and cylinder 10 constitute, in effect, the service member. On the forward end of the cylinder is a head 15 which has a hook 18 for hooking around the king pin and this head slides in guideways 19 on the upper surface of the upper fifth wheel. A draft latch 20 is pivoted to the trailer as at 21. A sliding bolt 22 locks the latch around the king pin and it may be released by a lever 23 mounted at the side of the trailer frame and which is swingable to engage and rock a bell crank 24 connected to a rod 25 in turn connected to a bell crank 26. If desired, means may be provided so the bolt 22 may be shifted by the operator seat in the tractor, such a means being illustrated in the form of the rod 25 which may have connections to the tractor. The parts are shown in coupled position in Fig. 2. When the bolt 22 is retracted, a spring pressed blocking member 22a is projected in front of the bolt. As the king pin moves forwardly the latch 20 is swung and it rides under the blocking member, which it can do because of the inclined surface 22b, and it pushes the bolt 22 into further retracted position due to the inclined surface 20a. Thus the blocking member is elevated out of blocking position because it rides on the higher surface of the latch 20, and when the latch is swung reversely in coupling, the bolt 22 is projected into unblocking position underneath the blocking member. This is all in correspondence to the arrangement shown in my said patent and is one form of draft coupling means which may be used with the present invention. When the tractor pulls forwardly the king pin pulls the service bar forwardly, forces being delivered through the member 18 around which the king pin cannot shift due to the fact that the king pin is confined in the slot 6. When, however, the king pin reaches the off-set portion 8, it may shift around the part 18 and the part 9 for final disengagement. Upon coupling, the king pin moves reversely in the off-set portion 8 in behind the hook 18, and then pushes the service bar rearwardly, and ultimately the portion 31 of the head 15 will strike the heel 32 of the latch and swing it around the king pin and the bolt 22 moves into locking position.

The supporting structure may be in the form of a frame 35, having land engaging wheels 36. A member 37 is slidably mounted in a forward guideway 38 and a member 39 is mounted in a rearward guideway 40. It will be understood that there is a guideway on each side of the trailer as illustrated in Fig. 2. Adjacent the lower end of each guideway 40 is a rack or toothed device 41, and mounted upon each side of the support is a pawl 42, each acted upon by a spring 43. A link 45 is connected to the pawl and extends to and is connected to a pivoted member 46 at the forward end of the support. A pair of links or thrust members 47 are connected to the service bar as at 48 and are connected to the support as at 49 through the means of a lost play connection, provided, in this instance, by a pin and elongated slot, the slot being shown at 50. The rocker members 46 engage the ends of the thrust links 47 as at 51.

In Fig. 1 the legs are shown in transit position; that is folded position. They have been pushed upwardly by the rearward movement of the service member. When it is desired to uncouple the tractor and semi-trailer, the bolt 22 is shifted to release the draft latch 20, and then the tractor pulls forwardly drawing the service bar with it. Brakes may be mounted on the semi-trailer and they may be applied upon the actuation of the bolt 22 in accordance with my Patent No. 2,135,205. The links 47 pull the legs downwardly; that is from the Fig. 1 position toward the Fig. 3 position. As the legs are pulled downwardly the detent 42 moves along the rack 41 to hold the legs positioned in any one of the positions that the detent may take in the rack. Suppose, for example, that the support hits a high spot or hummock, as shown in Fig. 3, before the king pin has moved to the forward offset end of the slot 6. Instead of forcibly tending to jack the trailer, by a cam action due to the inclined guideways, the spring 12 compresses and the cylinder and head 15 continue moving forwardly until ultimately the king pin is released.

With this arrangement, however, the head 15 must be held in its forward position so that a coupling can be made. The released position is shown in Fig. 7, and also shown in a spring pressed detent 53 carried by the head 15 which catches in a notch 54 which may be in a guideway 19. This detent 53 is arranged to swing into the socket for the king pin. As shown in Fig. 3 the detent 42 has caught in an intermediate notch of the rack. If there were no hummock the legs would continue further down. If the hummock were higher the detent 42 would catch in a higher notch.

Now in making a coupling the king pin moves into its socket as shown in Fig. 7, and the first thing that happens is that the king pin itself engages and swings the latch 53 so that the head 15 and service bar may be shifted rearwardly. Before rearward motion is transmitted to the legs, however, the thrust members 47 shift rearwardly, engage and rock the member 46, and through the rod 45 disengage the pawl 42 from the rack. This action takes place before there is any actual thrust on the legs due to the slots 50. Then the ends of the slots 50 engage the member 49 and continued rearward movement pushes the legs to transit position, and ultimately the latch 20 swings into locked position as shown in Fig. 2 and as previously described. This relieves any of the service mechanism from forces of the type designed to elevate the trailer, since the pawl 42 is disengaged before any actual rearward forces are delivered to the support. As explained in the early part of this specification where the support itself engages in a notch, it is sometimes necessary that the compressive forces exerted by the tractor in backing into the trailer forcibly eject the support out of the notch, and this is in the nature of the jacking action of the trailer frame which puts a very heavy load on the operating parts, especially when the trailer is loaded.

It is, of course, desirable to have the supporting legs at quite a forward position so as to support the trailer frame well forward. However, the legs in transit position must be sufficiently rearwardly to permit the tractor to turn substantially to a position at right angles to the trailer frame, and therefore it follows that the transit position of the legs must be sufficiently rearward to permit the wheels of the tractor to shift in under the trailer in the right angular position. The arrangement shown in Figs. 1 and 3 facilitates this action, in that the legs are not only slidably pushed on the inclined guideways but the supports are also swung pivotally. As the member 37 and the member 39 shift rearwardly along the inclined guideways there is merely a sliding and elevating action until the member 37 comes to the end of the guideway 38. At this time, the member 39 is approximately at the location X in the guideway 40. The connection at 49 is below the member 37 and continued rearward movement of the service member causes the legs to shift pivotally around the center at A, thus raising the lower end of the supporting structure and swinging it rearwardly with member 39 operating in the upper arcuate portion of guide 40. This pivotal movement thus swings the support to give clearance for the tractor wheels. With this arrangement the elevation of and lowering of the semi-trailer frame in coupling and uncoupling may be materially minimized because the legs can be pulled downwardly to such an extent as to hold the trailer-frame well elevated. At the same time, the legs may be shifted sufficiently upwardly and rearwardly for transit. The final swinging of the support and movement towards folded position swings the lower ends both rearwardly and upwardly for allowing maximum clearance for operation. This permits of placing the legs further forward on the semi-trailer frame and the pulling of the legs further down into supporting position.

Figure 5:
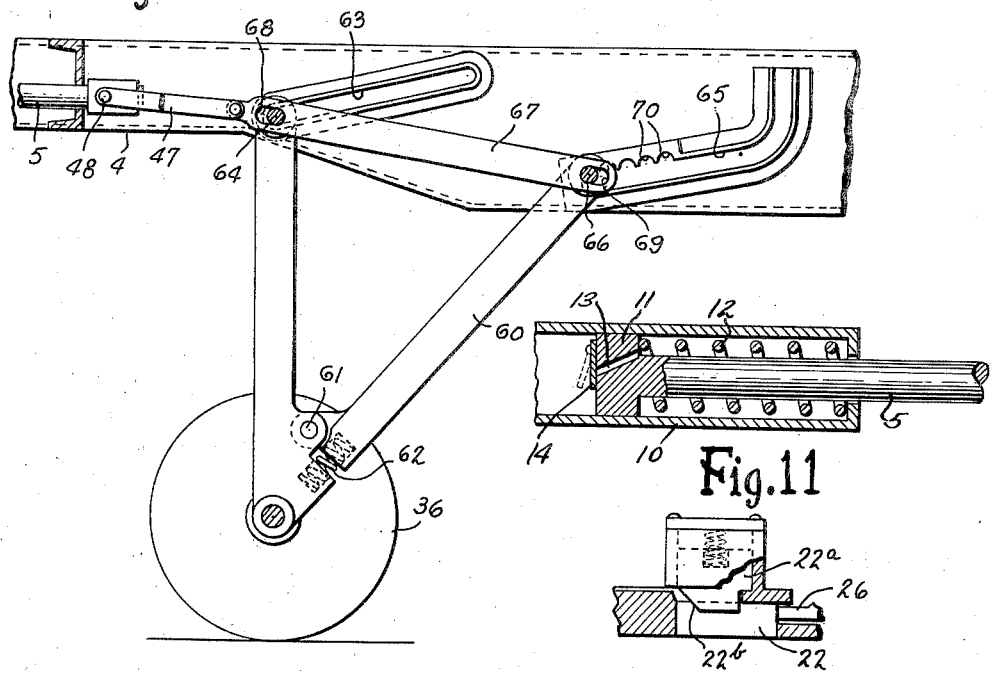
Fig. 5 is a view of the form shown in Fig. 4 illustrating the legs in supporting position.
Figure 10:
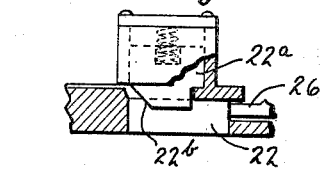
Fig. 10 is a cross sectional view taken substantially on line 10—10 of Fig. 2 showing the latch arrangement.

A modified form is shown in Figs. 4 and 5. In this form the support, as distinguished from being a solid frame, is of an articulated nature, one member 60 being pivoted as at 61 and acted upon by a spring 62. The service bar and thrust links are the same in principle as those previously described, and bear the same reference characters. The forward guideway is at 63 for a cross member 66. A link 67 has a slot 68 forming a lost play connection relative to the cross member 64, and a slot 69 providing a lost play connection with the member 66. The guideway 65 is provided with a plurality of notches 70. It will be understood that there are guideways at each side of the trailer frame, and that the links 67 may be in duplicate.

The elevated position is shown in Fig. 4, the legs having been pushed rearwardly by force delivered to the cross member 64. In uncoupling, forward movement of the service bar shifts the links 67 forwardly until the member 64 is engaged at the end of the elongated aperture 68, and then the legs are pulled down to a position as illustrated in Fig. 5. The member 66 functions along the notched formation 70 and comes to rest in one of the notches which may depend on whether or not the legs strike a hummock. In coupling, the first thing that happens is that the service bar is shifted rearwardly without movement of the support, due to the slot 68, but at this time the links 67 push the cross member 66 out of its engaging notch. This action swings the struts 60 pivotally around the point 61, compressing spring 62. Then continued rearward movement shifts the legs back to the Fig. 4 position.

In Fig. 6 a hand operated arrangement is shown. The legs and guideways and the detent may be the same as that shown in Fig. 1 and bear the same reference characters. The links 47a are connected to a travelling nut 71 mounted on a threaded rod which is turned manually through the means of a handle 72, and the pinion gears illustrated. As the nut is shifted to the right as this figure is viewed, the links 45 are shifted to disengage the pawl and then the legs are elevated. Reverse shift of the nut causes a lowering of the leg until such time as the legs are properly positioned with the detent in one of the notches in the rack. The form shown in Figs. 4 and 5 may also be operated by hand.

A modified form of coupling head for an automatic tractor semi-trailer combination is shown in Figs. 8 and 9. In this form, instead of latching the coupling head at the forward end of the slot in the upper fifth wheel member, the coupling head is permitted to retract into the slot. In this form the center slot 6 and the off-set part 8a of the semi-trailer may be the same as is also the cylinder 10 and service bar. However, the head 15a has a pivotally mounted draft abutment 18a, the same being pivoted at 27 and acted upon by a spring 29. In this case the guideway 19a may be laterally removed from the center slot 6 in order to accommodate the requisite increased width of the head 15a. The pivoted member 18a can only swing forwardly a limited amount where it strikes the abutting end of the head as illustrated at 15b. In this form the king pin must pull the head 15a and the service bar forwardly to the complete released position as shown in Fig. 9, at which time the king pin moves laterally around the member 18a and out through the off-set slot 8a. In this form the lateral abutment 9, or the equivalent thereof, may not be used so that the king pin only moves around the part 18a. If the supports strike a hummock causing a compression of the spring 12, the spring will cause the head 15a to withdraw along the slot 6. However, upon making the coupling, the king pin moves into the slot and can move past the member 18a by rocking it against the action of the spring 29. Thus, while with the arrangement shown in Fig. 7, the coupling is held at the forward end of the support in the trailer for the purpose of establishing another coupling with a tractor, the head 15a may retract into the slot and the king pin may be latched therewith.

The arrangement of the cylinder 10 and head 11 provides an air cushion which cushions on the parts when a coupling is established. As the king pin strikes the head 15 or 15a and shifts it rearwardly, air is trapped forwardly of the head 11 by the flapper valve 14. This forms an air cushion protecting the parts of the mechanism, but ultimately the air leaks out so that after a coupling has been established the head 15 may abut the forward end of the cylinder 10.

I claim:

1. In a semi-trailer, a shiftable service bar having a coupling device thereon for coupling with a tractor and which coupling device is movable from and to a substantially definitely located coupled position and a substantially definitely located uncoupled position by the tractor; a movable support mounted on the semi-trailer, latch means for holding the support on various supporting positions as determined by the contour of the ground, means interconnecting the service bar and the support for shifting the support to and from supporting position and including a yieldable connection constructed and arranged so that the coupling head may shift to the definitely located uncoupled position while the support comes to rest at a supporting position determined by the ground contour, and means operable from the service bar for unlatching the latch prior to the delivery of forces from the service bar for shifting the support from supporting position.

2. In a semi-trailer for use with a tractor, a support shiftable to and from transit and supporting positions, means for holding the support in one of a plurality of supporting positions, a shiftable service member connected to the support, draft coupling means on the semi-trailer for coupling with a coupling device on a tractor and including means on the service member for engagement with an element on the tractor through a substantially predetermined length of movement of a coupling device on the tractor relative to the semi-trailer in the coupling and uncoupling operations, whereby the support is shifted to transit position and to supporting position by the tractor, and yieldable means in the service member which yields when the support stops in one of the said supporting positions and said means on the service member continues moving with said element on the tractor to the end of the said substantially predetermined length of movement.

3. In a semi-trailer, the forward end of which is adapted to rest upon and be coupled to a tractor, a support shiftable to and from transit and supporting positions, means for holding the support in one of a plurality of supporting positions, a shiftable service member connected to the support, coupling means on the semi-trailer including a guideway for a coupling device on the tractor, the forward end of which guideway opens at the forward end of the trailer, and including means for establishing a draft connection when the device on the tractor is at the rear end of the guideway, and including means on the service member which slides along the guideway and which engages an element on the tractor so that the support is shifted by the tractor to supporting position in uncoupling and to transit position in coupling, the means on the service member and the element in the tractor being arranged to disengage each other substantially at the open end of the guideway, and yielding means in the service member which yields when the support strikes the ground and stops in supporting position for continued movement of said means on the service member to substantially the open end of the slot for disengaging the element on the tractor.

4. In a semi-trailer, the forward end of which is arranged to rest upon and be coupled to a tractor, a support shiftable to and from transit and supporting positions, means for holding the support in one of a plurality of supporting positions, a guideway opening at the forward end of the semi-trailer for receiving a coupling member on the tractor, means for establishing a draft connection between the semi-trailer and the coupling member when the coupling member is at the rear of the guideway, means on the service member slidable along the guideway and engageable with and disengageable from the coupling member on the tractor substantially as it enters and leaves the guideway respectively whereby the power of the tractor is delivered through the service member for shifting the support to and from the said positions, and yielding means in the service member which functions for movement of the engaging means on the service member toward and to the open end of the guideway subsequently to the stopping of the support in supporting position as by means of the support coming into contact with the ground.

5. In a semi-trailer for use with a tractor having a lower fifth wheel and an upstanding king pin, a guideway opening at the forward end of the semi-trailer for slidably receiving the king pin, coupling means for establishing a draft connection with the king pin when the king pin is at the rear of the guideway and including an element slidable along the guideway and disengageable from the king pin substantially as the king pin moves out of the open end of the guideway and engageable with the king pin as the king pin moves back in the guideway so that the king pin moves the element in both directions, a support shiftable to and from transit and supporting positions, means for holding the support in one of a plurality of supporting positions depending upon the contour of the ground, and a yieldable connection between the support and the said element.

6. In a semi-trailer for use with a tractor having a lower fifth wheel and an upstanding king pin, a guideway opening at the forward end of the semi-trailer for slidably receiving the king pin, coupling means for establishing a draft connection with the king pin when the king pin is at the rear of the guideway and including an element slidable along the guideway and disengageable from the king pin substantially as the king pin moves out of the open end of the guideway and engageable with the king pin as the king pin moves back in the guideway so that the king pin moves the element in both directions, a support shiftable to and from transit and supporting positions, means for holding the support in one of a plurality of supporting positions depending upon the contour of the ground, a service member slidably mounted in the semi-trailer and connected at one end to said element and at its other end to the support, said service member including two relatively movable parts with a spring interposed between the parts.

7. In a semi-trailer for use with a tractor having a lower fifth wheel and an upstanding king pin, a guideway opening at the forward end of the semi-trailer for slidably receiving the king pin, coupling means for establishing a draft connection with the king pin when the king pin is at the rear of the guideway and including an element slidable along the guideway and disengageable from the king pin substantially as the king pin moves out of the open end of the guideway and engageable with the king pin as the king pin moves back in the guideway so that the king pin moves the element in both directions, a support shiftable to and from transit and supporting positions, means for holding the support in one of a plurality of supporting positions depending upon the contour of the ground, a cylinder secured to said element, a rod connected to the support, a head on the rod disposed in the cylinder and a spring disposed between said head and one end of the cylinder and arranged to yield when the support stops in a supporting position prior to said element having reached the forward end of the guideway.

8. In a semi-trailer for use with a tractor having a lower fifth wheel and an upstanding king pin, a guideway opening at the forward end of the semi-trailer for slidably receiving the king pin, coupling means for establishing a draft connection with the king pin when the king pin is at the rear of the guideway and including an element slidable along the guideway and disengageable from the king pin substantially as the king pin moves out of the open end of the guideway and engageable with the king pin as the king pin moves back in the guideway so that the king pin moves the element in both directions, a support shiftable to and from transit and supporting positions, means for holding the support in one of a plurality of supporting positions depending upon the contour of the ground, a cylinder secured to said element, a rod connected to the support, a head on the rod disposed in the cylinder and a spring disposed between said head and one end of the cylinder and arranged to yield when the support stops in a supporting position prior to said element having reached the forward end of the guideway, an air passageway leading to the space between the head and one end of the cylinder, and a check valve cooperating therewith to form an air cushion between the element and the rod.

9. In a semi-trailer for use with a tractor having a lower fifth wheel and an upstanding king pin, a guideway opening at the forward end of the semi-trailer for slidably receiving the king pin, coupling means for establishing a draft connection with the king pin when the king pin is at the rear of the guideway and including an element slidable along the guideway and disengageable from the king pin substantially as the king pin moves out of the open end of the guideway and engageable with the king pin as the king pin moves back in the guideway so that the king pin moves the element in both directions, a support shiftable to and from transit and supporting positions, means for holding the support in one of a plurality of supporting positions depending upon the contour of the ground, and a yieldable connection between the support and the said element, and means for holding the element at the forward end of the guideway against the action of the yieldable connection, said means being operable to release the element as the king pin moves into engagement with the element.

10. In a semi-trailer for use with a tractor having a lower fifth wheel and an upstanding king pin, a guideway opening at the forward end of the semi-trailer for slidably receiving the king pin, coupling means for establishing a draft connection with the king pin when the king pin is at the rear of the guideway and including an element slidable along the guideway and disengageable from the king pin substantially as the king pin moves out of the open end of the guideway and engageable with the king pin as the king pin moves back in the guideway so that the king pin moves the element in both directions, a support shiftable to and from transit and supporting positions, means for holding the support in one of a plurality of supporting positions depending upon the contour of the ground, a shiftable service member interconnecting the element and the support and including relatively movable parts with an interposed spring arranged to yield as the element is pulled forwardly subsequently to the support having stopped in supporting position as by means of engaging the ground, a spring pressed detent operable to hold the element at the forward end of the guideway as the king pin moves therefrom, said detent being engageable by the king pin as the king pin moves into engagement with the element in coupling to release the same.

11. In a semi-trailer arranged to have its forward end rest upon and to be coupled to a tractor, a service member engageable with a device on the tractor for the shift of the service member fore and aft by the tractor as the tractor moves out from under the semi-trailer and moves backwardly under the semi-trailer respectively, a support shiftable to and from transit and supporting positions, pivoted latching means for holding the support in supporting position, means connecting the service member and the support for shift of the support by the tractor and having an operable association with the latching means arranged to, as the tractor backs under the trailer, unlatch the latching means prior to delivering forces to the support for shifting the same to transit position.

12. In a semi-trailer arranged to have its forward end rest upon and to be coupled to a tractor, a service member engageable with a device on the tractor for the shift of the service member fore and aft as the tractor moves out from under the semi-trailer and moves backwardly under the semi-trailer respectively, a support shiftable to and from transit and supporting positions, latching means for holding the support in supporting position, means connecting the service member and the support with a lost play connection, said latching means being associated with the connecting means for operation of the latch to unlatched position in the course of the lost play movement so that as the tractor backs into the semi-trailer during coupling the latch is first disengaged and then forces are delivered to the support to shift it to transit position.

13. In a semi-trailer arranged to have its forward end rest upon and to be coupled to a tractor, a service member engageable with a device on the tractor for the shift of the service member fore and aft as the tractor moves out from under the semi-trailer and moves backwardly under the semi-trailer respectively, a support shiftable to and from transit and supporting positions, means comprising a rack on the semi-trailer frame and detent on the support for holding the support in one of a plurality of supporting positions, means interconnecting the service member and the support and having a lost play connection, means operatively associating the detent with the last said means for operation of the detent to disengage the rack as the service bar is moved by the tractor backwardly of the semi-trailer and in the course of said lost play movement.

14. In a semi-trailer for use with a tractor having a lower fifth wheel and an upstanding king pin, a guideway opening at the forward end of the semi-trailer for slidably receiving the king pin, draft coupling means for the king pin at the rear of the guideway, an element slidable along the guideway and engageable with and disengageable from the king pin as the king pin moves into and out of the guideway respectively, a service member having a part connected to the element and having a relatively movable second part, spring means interposed between the parts, a support shiftable to and from transit and supporting positions, means interconnecting the second part of the service member and the support with a lost play connection for shifting the support to and from said positions, and latching means for holding the support in supporting position and operatively associated with the last mentioned means for operation of the latch in the course of the lost play movement.

15. In a semi-trailer for use with a tractor having a lower fifth wheel and an upstanding king pin, a guideway opening at the forward end of the semi-trailer for slidably receiving the king pin, draft coupling means for the king pin at the rear of the guideway, an element slidable along the guideway and engageable with an disengageable from the king pin as the king pin moves into and out of the guideway respectively, a service member having a part connected to the element and having a relatively movable second part, spring means interposed between the parts, a support shiftable to and from transit and supporting positions, means interconnecting the second part of the service member and the support with a lost play connection for shifting the support to and from said positions, and latching means for holding the support in supporting position and operatively associated with the last mentioned means for operation of the latch in the course of the lost play movement, and a detent for holding the element in its forward position adjacent the open end of the guideway and engageable by the king pin for release thereof.

16. In a semi-trailer adapted for connection with a tractor having an upstanding king pin, means on the trailer having a slot opening at its forward end to slidably receive the king pin, a draft coupling for the king pin at the rear of the slot, a support for the semi-trailer, an element shiftable along the guideway, a yieldably extensible service member connected to the element and to the support, a pivoted jaw on the element arranged to project into the slot forwardly of the king pin when the tractor and semi-trailer are coupled, means limiting the forward pivotal action of the jaw so that forward movement of the king pin pulls the support into supporting position, said king pin being disengageable by the jaw by lateral movement substantially as the king pin passes out of said slot, said jaw pivoting for movement of the king pin past the same when the tractor and semi-trailer are coupled.

17. In a semi-trailer adapted for connection with a tractor having an upstanding king pin, means on the trailer having a slot opening at its forward end to slidably receive the king pin, a draft coupling for the king pin at the rear of the slot, a support for the semi-trailer, an element shiftable along the guideway, a yieldably extensible service member connected to the element and to the support, said slot being off-set at its forward end for lateral movement of the king pin, a pivoted jaw on the element arranged to project into the slot forwardly of the king pin when the tractor and semi-trailer are coupled, means limiting the forward pivotal action of the jaw so that forward movement of the king pin pulls the support into supporting position, said king pin being disengageable by the jaw by said lateral movement, said jaw pivoting for movement of the king pin past the same when the tractor and semi-trailer are coupled.

18. In a semi-trailer adapted for use with a tractor having an upstanding king pin, means on the semi-trailer providing a guideway for the king pin which is open at the forward end of the semi-trailer and which has a laterally offset portion, draft coupling means for the king pin adjacent the rear of the guideway, a service member slidable along the guideway and having a pivoted jaw for engaging the king pin, means limiting the pivotal movement of the jaw forwardly so that forward movement of the king pin pulls the service member forwardly along the guideway, said jaw being arranged to pivot rearwardly for the passage of the king pin back of the same as the king pin passes rearwarly in the offset portion of guideway.

19. In a semi-trailer for use with a tractor having a coupling member, means on the semi-trailer providing a guideway for the coupling member and which opens at the forward end of the semi-trailer, draft coupling means for the coupling member adjacent the rear of the guideway, a support for the semi-trailer, means for latching the support in one of a number of supporting positions, a yieldable service member connected to the support and having a head portion slidable along the guideway, and a jaw on the head pivotally mounted for rearward pivotal movement, said jaw arranged to engage forwardly of the coupling member on the tractor, and being disengageable from the coupling member by relative lateral movement substantially at the forward end of the guideway, said jaw pivoting rearwardly for movement of the king pin past the same as the king pin moves back in the guideway so that the coupling member and head may be coupled together regardless of the position of the head along the guideway.

20. In a semi-trailer, adapted to have its forward end rest upon and to be coupled to a tractor, a support shiftable to and from transit and supporting positions and comprising guideways, said support including a pivoted latch member, a plurality of notches in one of the guideways, means on the pivoted member for engaging one of the notches in supporting position, spring means acting on the pivoted member to cause it to engage the notches, and reciprocable service means having a lost play connection with the support for shifting it to and from transit and supporting positions and having a connection with the pivoted member to disengage it from the notch engaged in the course of said lost play movement.

21. In a semi-trailer adapted to have its forward end rest upon and to be coupled to a tractor, a support for a semi-trailer comprising a supporting structure, guideways along which the supporting structure may shift to and from supporting position, a latch for holding the structure in supporting position, operating means reciprocable upon relative motion between said tractor and semi-trailer, said operating means having a lost play connection with the supporting structure and associated with the latch for disengaging the latch in the course of the lost play movement when the operating means is operated in a manner designed to shift the structure from supporting position to transit position.

WILLIAM H. WILSON.